United States Patent
Gärtner et al.

(10) Patent No.: US 9,725,361 B2
(45) Date of Patent: Aug. 8, 2017

(54) METHOD FOR THE WET SLAKING OF CALCIUM AND MAGNESIUM OXIDES FROM CALCOMAGNESIAN COMPOUNDS

(71) Applicant: S. A. Lhoist Recherche et Developpement, Ottignies-Louvain-la-neuve (BE)

(72) Inventors: Robert Sebastian Gärtner, Buizingen (BE); Marion Lorgouilloux, Strepy-Bracquegnies (BE)

(73) Assignee: S. A. Lhoist Recherche et Developpment, Ottignies-Louvain-la (BE)

( * ) Notice: Subject to any disclaimer, the term of this patent is extended or adjusted under 35 U.S.C. 154(b) by 43 days.

(21) Appl. No.: 14/766,508

(22) PCT Filed: Feb. 19, 2014

(86) PCT No.: PCT/EP2014/053226
§ 371 (c)(1),
(2) Date: Aug. 7, 2015

(87) PCT Pub. No.: WO2014/128159
PCT Pub. Date: Aug. 28, 2014

(65) Prior Publication Data
US 2015/0376059 A1 Dec. 31, 2015

Related U.S. Application Data

(60) Provisional application No. 61/865,821, filed on Aug. 14, 2013.

(30) Foreign Application Priority Data

Feb. 19, 2013 (BE) .................... 2013/0105

(51) Int. Cl.
C04B 2/06 (2006.01)
C01F 5/22 (2006.01)
C01F 5/16 (2006.01)
C01F 11/00 (2006.01)
C01F 11/02 (2006.01)

(52) U.S. Cl.
CPC .................. *C04B 2/06* (2013.01); *C01F 5/16* (2013.01); *C01F 5/22* (2013.01); *C01F 11/00* (2013.01); *C01F 11/02* (2013.01); *C01P 2004/61* (2013.01); *C01P 2004/82* (2013.01)

(58) Field of Classification Search
CPC ...... C01B 2/06; C01F 5/22; C01F 5/16; C01F 11/00; C01F 11/02
See application file for complete search history.

(56) References Cited

U.S. PATENT DOCUMENTS

| | | | | |
|---|---|---|---|---|
| 2,408,647 A | * | 10/1946 | Huntzicker | C04B 2/02 106/800 |
| 2,833,626 A | * | 5/1958 | Knibbs | C04B 2/04 422/162 |
| 5,705,141 A | * | 1/1998 | Dumont | B01D 53/502 423/636 |
| 2007/0036702 A1 | * | 2/2007 | Huege | C01F 7/74 423/117 |

FOREIGN PATENT DOCUMENTS

| | | | |
|---|---|---|---|
| JP | 01212214 A | * | 8/1989 |
| WO | 2014/053226 | | 2/2014 |
| WO | 2014/128159 A1 | | 8/2014 |

* cited by examiner

*Primary Examiner* — Melvin C Mayes
*Assistant Examiner* — Michael Forrest
(74) *Attorney, Agent, or Firm* — Whitaker Chalk Swindle & Schwartz PLLC; Charles D. Gunter, Jr.

(57) ABSTRACT

A method is shown for the slaking of calcium oxides and magnesium from calcomagnesian compound containing at least 10 wt. % of MgO in relation to the total weight of said calcomagnesian compound, in which a slaking aqueous phase is supplied to a slaking device, and slaking the compound containing anhydrous dolomite delivered to the slaking device, by means of the slaking aqueous phase, forming hydrated solid particles of $Mg(OH)_2$, in the presence of an additive.

24 Claims, 2 Drawing Sheets

METHOD FOR THE WET SLAKING OF CALCIUM AND MAGNESIUM OXIDES FROM CALCOMAGNESIAN COMPOUNDS

BACKGROUND OF THE INVENTION

1. Field of the Invention

This invention relates to a method for the wet slaking of calcium and magnesium oxides from calco-magnesian compounds preferably containing at least 10% by weight of MgO relative to the total weight of said calco-magnesian compound, comprising the steps of:
- feeding said calco-magnesian compound containing MgO into a slaking equipment;
- feeding an aqueous slaking phase into said slaking equipment; and
- slaking the said calcium and magnesium oxides of the said calco-magnesian compound fed into the said slaking equipment, with said aqueous slaking phase, leading to the formation of slaked solid particles of calcium and magnesium hydroxides (e.g. of general formula $xCa(OH)_2 \cdot yMg(OH)_2$).

2. Description of the Prior Art

Typically, the slaking of MgO to form $Mg(OH)_2$, compared with conventional slaking of CaO to form $Ca(OH)_2$, is a difficult reaction to carry out profitably at industrial level. One of the possible routes to produce fully hydrated products, namely in which MgO and CaO are fully converted to $Mg(OH)_2$ and $Ca(OH)_2$ respectively, is high pressure hydration, during which a supply of heat is sometimes necessary as a function of the reactivity of the MgO. In some cases during slaking in a wet process, very lengthy reaction times may overcome these drawbacks. However, the use of high pressure hydrators with or without the supply of heat, or lengthy residence times are as many obstacles which reduce the industrial production of magnesium hydroxide from MgO, the preference being given to the chemical production of $Mg(OH)_2$ from salts treated with caustic solutions.

Just as there exist limestone deposits (calcium carbonate of formula $CaCO_3$), there also exist dolomite deposits (mixed calcium and magnesium carbonate of general formula $xCaCO_3 \cdot yMgCO_3$ where x and y are molar coefficients such that x/y=0.8 to 1.2), and deposits of other mixed carbonates of general formula $xCaCO_3 \cdot yMgCO_3$ where $1.2 \leq x/y \leq 25$) or any other mixed carbonate of calcium and magnesium. In the same manner as for limestone, dolomite or the other aforementioned mixed carbonates can be calcined, thereby producing dolomitic quicklime of formula xCaO.yMgO or any other mixed calcium and magnesium oxide. Similar to quicklime, a hydration reaction is initiated when dolomitic quicklime or other aforementioned mixed oxide is contacted with water. However, as mentioned above, it is known that magnesium oxide has much lower reactivity to water than high calcium quicklime that is highly hydrophilic, the hydration of these calcined compounds thereby becoming much more complex than the hydration of high calcium quicklime.

As mentioned above, to obtain a fully hydrated product by a wet process, persons skilled in the art currently have recourse to a hydrothermal hydration process using an aqueous phase pre-heated to a temperature typically of between 40 and 80° C. for an extended reaction time (typically 5 to 48 h). Another possible process, to which skilled persons may have recourse, is a high pressure hydration process. At industrial level the first option is preferred, although the residence time and the quality of the hydrated product are highly dependent on the reactivity of the oxides in the initial compound.

In all cases, these slaking processes are complex and costly and are detrimental to the industrial treatment of these MgO-containing compounds to obtain compounds containing $Mg(OH)_2$, with the risk that a portion of the MgO will not be properly hydrated.

FR2669327 A1 teaches the use of chemical agents such as amines or glycols to produce a hydrated lime at regulated or controlled temperature having improved plastic properties and high specific surface areas.

WO09209528 also concerns the use of additives selected from among glycols and/or amines to produce calcium and/or magnesium hydroxides having high specific surface areas.

U.S. Pat. No. 3,120,444 discloses the addition of low molecular weight aliphatic alcohols to obtain hydrated lime with improved plastic properties.

U.S. Pat. No. 1,856,763 discloses a method to produce quicklime of high purity with delayed reactivity for use thereof in mortars.

It is the objective of the invention to overcome the shortcomings of the prior art by providing a method allowing the simple, low-cost production of a compound via wet process that can be implemented at industrial level, the compound containing slaked solid particles of $Mg(OH)_2$ whereby hydration is accelerated and/or whereby the rate of conversion of MgO oxide to the hydroxide $Mg(OH)_2$ is increased.

SUMMARY OF THE INVENTION

To solve this problem, there is provided according to the invention a method such as first set out above wherein the said slaking is performed in the presence of an additive selected from the group formed by water-soluble metal hydroxides, in particular alkaline hydroxides (particularly Na, Li or K hydroxides), water-soluble metal silicates in particular water-soluble alkaline or alkaline-earth silicates (particularly Na, Li, K, Ca or Mg silicates), water-soluble aluminates in particular K, Na, Li or $NH_4$ aluminates (particularly sodium aluminate), water-soluble aluminium salts in particular aluminium fluoride, nitrate, chloride or lactate (particularly aluminium nitrate and lactate), water-soluble metal halides in particular chlorides, bromides or fluorides, water-soluble metal nitrates, water-soluble metal lactates, water-soluble ammonium salts, ammonia and the mixtures thereof.

In the meaning of the present invention, by the terms <<water-soluble>> is meant that the additives are at least partly water-soluble. The solubility rate of the additives must not necessarily be high, the additives being able to become solubilised during the slaking reaction.

The additives selected from the above said group have the advantage of allowing accelerated and/or improved hydration at ambient pressure of the MgO-containing compound with relatively short reaction times. Therefore the slaking reaction in the presence of the said additives becomes industrially applicable and hence allows the production of compounds comprising a greater amount of slaked solid particles in simple and low-cost manner.

Advantageously the said calcium and magnesium oxides of the calco-magnesian compound have a magnesium oxide content of less than 50% by weight relative to the weight of the said calco-magnesian compound, and preferably have a calcium/magnesium molar ratio of between 0.8 and 1.2.

More particularly the said calco-magnesian compound is selected from the group formed by calcined, semi-calcined or semi-hydrated dolomite, mixed calco-magnesian compounds, in particular mixed calcium and magnesium oxides having a substantial MgO content namely higher than 10% by weight relative to the total weight of the mixed oxide, and the mixtures thereof.

The hydration of dolomitic quicklime and of all materials having a high proportion of MgO (namely at least 10% by weight relative to the total weight of the calco-magnesian compound containing the said MgO, or in some embodiments relative to the total weight of mixed oxide) is incomplete in conventional industrial processes and requires either less burned materials (soft burned dolime) to obtain acceptable conversion rates or lengthy reaction times scarcely adapted to an industrial process.

This low reactivity of the MgO portion is frequently explained by the presence of overburned products due to the sensitivity of magnesium oxide during the calcining operation. For dolomitic products this over-burning is typically the result of a need to apply temperatures allowing at least partially to also obtain the conversion of calcium carbonate ($CaCO_3$) to calcium oxide (quicklime).

It follows thereupon in the industrial practice for the hydration of calcined dolomite, dolomitic lime or magnesian lime, but also of any similar product containing substantial amounts of MgO, depending on the loss of reactivity caused by over-burning, that lower conversion rates to $Mg(OH)_2$ are obtained when slaking by a wet process or that very long reaction times are required to obtain an acceptable conversion rate.

Alternatively, the application of extreme slaking conditions may be required to obtain a more completely hydrated product such as the application of high pressures, reaction times longer than 24 hours or steam hydration in relation to the degrees of over-burning for products of mineral origin.

For wet slaking, conversion rates of MgO to $Mg(OH)_2$ of 10 to 60% Mg could be obtained in conventional equipment using typical residence times for the slaking of high calcium quicklime. Such equipment is cited for example in Boynton pp. 363, in particular a detention slaker with a mean residence time of 20 to 40 min, a paste slaker with a mean residence time of 5 to 20 min, a ball mill slaker with a mean residence time of 10 to 20 min, a vessel under continuous or discontinuous agitation with a mean residence time of less than one hour, a screw slaker with a mean residence time of 10 to 30 min or a drum slaker with a mean residence time of 10 to 30 min in relation to the reactivity of the calcium and magnesium oxides of the starting calco-magnesian compound. In such cases, an extension of the residence time to a period of 5 to 48 h could increase the conversion rate up to complete conversion. However as mentioned above, said extension of the residence time would be costly to implement with the risk that in numerous cases the conversion to magnesium hydroxide would remain largely incomplete.

These hydrated products therefore typically contain significant amounts of non-reacted MgO. This MgO may react subsequently for example during transport, during use or even in derivative products prepared from these hydrated products, typically creating numerous problems, starting with expansion of the product during later hydration.

In the method of the invention, the presence of the additive allows a significant increase in conversion rates with relatively short reaction times compared with conventional slaking processes for low-reactivity compounds, at ambient pressure and within acceptable temperature ranges for industrial application.

Advantageously, the said alkaline hydroxides are selected from the group formed by sodium hydroxide, potassium hydroxide, lithium hydroxide and the mixtures thereof.

Advantageously, the said water-soluble alkaline or alkaline-earth silicates are selected from the group formed of calcium silicate, magnesium silicate, sodium silicate, potassium silicate, lithium silicate. Preferably the silicate is an alkaline silicate, advantageously a sodium silicate.

Advantageously, the said water-soluble aluminates are selected from the group formed of potassium aluminate, sodium aluminate, lithium aluminate, ammonium aluminate and the mixtures thereof. Preferably, the aluminate is a sodium aluminate.

Advantageously, the said water-soluble aluminium salts are selected from the group formed of aluminium fluoride, aluminium nitrate, aluminium chloride, aluminium lactate and the mixtures thereof. Preferably, the aluminium salt is aluminium lactate.

Advantageously, the said water-soluble metal halides are selected from the group formed of metal chlorides, metal bromides, metal fluorides and the mixtures thereof.

Advantageously, the said water soluble metal nitrates are selected from the group formed of alkaline nitrates, alkaline-earth nitrates and the mixtures thereof. Preferably, the nitrate is a sodium, lithium, calcium or magnesium nitrate.

Preferably, the said metal nitrates, lactates and halides comprise at least one atom of a metal selected from the group formed of aluminium, calcium and magnesium, more particularly aluminium and magnesium.

In a first particular embodiment of the method of the invention, the said additive is added to the said aqueous slaking phase before the feeding of the said aqueous slaking phase to form an additive-containing aqueous slaking phase.

In one variant of the method of the present invention, the said additive is added to the said aqueous slaking phase inside the said slaking equipment or in the said feed of the said aqueous slaking phase.

In a further variant of the method of the invention, the said additive is added to the said MgO-containing calco-magnesian compound or in the said feed of the said calco-magnesian compound.

In one preferred embodiment of the method of the present invention, the said additive is supplied at a content of between 0.1 and 20%, preferably between 1 and 10% by weight relative to the total weight of MgO.

In the particular case of calcined dolomites (xCaO.yMgO), these are usually characterized by their chemical purity and reactivity.

By high purity is meant a low percentage of impurities, i.e. in general less than 5%, advantageously less than 4% by weight and preferably less than 3%, even less than 2%, by weight of the conventional impurities initially contained in the dolomite ($SiO_2$, $Al_2O_3$, $Fe_2O_3$, $SO_3$ . . . ), but also a high content of CaO+MgO oxides. This also assumes limitation of all the other possible forms of calcium and magnesium such as unburnt materials ($CaCO_3$, $MgCO_3$) or compounds of calcium and/or magnesium silicate or aluminate type. The calcined dolomites used in the method of the invention contain more than 90% by weight, advantageously more than 93%, preferably more than 97% by weight of $CaCO_3$, $Ca(OH)_2$, CaO, $Mg(OH)_2$ and MgO and optionally residues of $MgCO_3$; CaO and MgO preferably being in majority.

The reactivity of calcined dolomite can be characterized by the reactivity test described in standard ASTM C110-02: 2002 §12. However, in addition to the characteristics described in the standard, the reactivity of dolomite is characterized by its $t_{70}$, value which represents the time required by the reaction medium to each 70° C. starting from the initial temperature set at 40° C. In the present invention another criterion, too, is considered, which similarly represents the time needed to reach 60° C. starting from 40° C. under the normalised conditions for this reactivity test.

The calco-magnesian compounds, more particularly those selected from the group formed by calcined, semi-calcined or semi-hydrated dolomite, mixed calco-magnesian compounds in particular mixed calcium and magnesium oxides having a substantial MgO content, namely higher than 10 weight % relative to the total weight of the mixed oxide, and the mixtures thereof, used in the method of the invention advantageously have a too of 5 minutes or less.

For the method subject of the present invention to be efficient, i.e. for the additives to have a significant role on the level of hydration of the MgO contained in the calco-magnesian products, the initial calco-magnesian product before hydration according to the method of the invention must have minimum reactivity.

Should the calco-magnesian products to be hydrated be very scarcely reactive, due for example to major over-burning of the starting mineral, the hydration of the MgO contained in these calco-magnesian compounds is most difficult and the additives claimed in the present invention, while they may improve the hydration percentage of MgO, will certainly not be able to obtain a hydration increase of 30%, preferably of 100%, more preferably of 150% and further preferably of 200%.

To describe the calco-magnesian compounds able to be used in the method of the invention, a very simple test has been developed and is described below. In the remainder hereof, it will be designated as a simplified conversion rate determination test, which measures the degree of reactivity of the calco-magnesian compounds to be hydrated.

For this test, four liters of demineralised water previously heated to 70° C. are placed in a graduated (semi-)cylindrical glass reactor with double jacket having an effective capacity of 5 dm$^3$ and inner diameter of about 15 cm. The reactor is open at the top allowing a mixer paddle connected to a motor and a thermocouple to be placed in the water. The water is stirred at 500-600 rpm. Water at 73° C. is caused to circulate in the double jacket using a thermostat circulating bath.

When thermal equilibrium is reached, i.e. when the temperature of the water in the reactor stabilises at 70° C.±1° C., 200 g of calco-magnesian product are added at once to the water under stirring. Stirring is maintained for 30 minutes, during which the temperature of the reaction medium must remain between 70° C. and 80° C. With scarcely reactive products, this temperature will remain close to 70° C. With more reactive products in particular those containing CaO, the temperature will be closer to 75, even 80° C. After a reaction time of 30 minutes, stirring is stopped and the suspension filtered through a Büchner. A sample of 30 g of solid product collected by filtration is dried at 150° C. in less than 30 minutes using an infrared thermobalance.

Once dried, the product is subjected to thermogravimetric analysis (TGA) and the conversion rate of MgO is calculated using the method described below.

Advantageously, the calco-magnesian products, which, according to this simplified conversion rate determination test, exhibit an MgO conversion rate of at least 10%, preferably higher than 15% and more preferably higher than 20%, are used in the method of the invention in the presence of at least one additive.

The calco-magnesian products described in the present invention are generally characterized after and/or before their hydration in accordance with the method of the present invention using a thermal analysis method and more particularly thermogravimetry. This measurement is performed by placing 50 mg to 2 g of the hydrated sample in a furnace equipped with a balance.

The weight of the sample is recorded during a temperature rise from ambient temperature up to a value of between 900 and 1000° C. at the rate of 5 to 20° C./min under a stream of air or nitrogen. The sample is dried at 150° C. prior to this thermogravimetric measurement. This method allows the quantitation of different compounds contained in the analysed sample, and in particular $Mg(OH)_2$, $Ca(OH)_2$ and $CaCO_3$. The non-hydrated or non-carbonated phases (e.g. CaO and MgO) cannot be identified and quantitated using this thermogravimetry method.

Before their hydration in accordance with the method subject of the present invention, the calco-magnesian products may contain $Ca(OH)_2$, possibly being i) calcium hydroxide, which may have been formed by reaction of CaO with humidity in the air during storage or transport steps for example (if the calco-magnesian products contain calcium in CaO form), or ii) Ca hydroxide, which may have formed during a preceding hydration step of the calco-magnesian compound, using a method different from the method subject of the present invention and not using an additive. The $Ca(OH)_2$ content of the calco-magnesian products before hydration in accordance with the method of the invention is between 1 and 65%, the top value corresponding to the particular case of semi-hydrated dolomite of general formula $Ca(OH)_2.MgO$ (i.e. about 65% $Ca(OH)_2$ and 35% MgO when impurities are neglected).

Since MgO is less sensitive to humidity than CaO, the calco-magnesian products before hydration in accordance with the method of the present invention generally contain less than 1.0%, preferably less than 0.5% and in particular less than 0.2% $Mg(OH)_2$.

In some cases, the calco-magnesian products may contain $CaCO_3$, possibly being i) residual calcium carbonate derived from the original mineral (e.g. dolomite), which has not decomposed during the calcining step of the mineral, or ii) calcium carbonate which may have formed by reaction of $Ca(OH)_2$ with ambient $CO_2$ during storage and transport steps for example. The $CaCO_3$ content of the calco-magnesian products before hydration may be between 1 and 72%, the top value corresponding to the particular case of semi-calcined dolomite of general formula $MgO.CaCO_3$ (i.e. about 29% MgO and 71% $CaCO_3$, when impurities are neglected).

After hydration according to the method of the present invention, the calco-magnesian products may again contain $CaCO_3$, since this compound is insensitive to hydration. They also contain $Ca(OH)_2$, either already initially contained in the calco-magnesian product (e.g. semi-hydrated dolomite) or resulting from hydration of CaO (if the calco-magnesian compound before hydration contains CaO). They also contain $Mg(OH)_2$, formed by hydration of the MgO contained in the calco-magnesian product before hydration.

In the case of calco-magnesian products containing $Mg(OH)_2$, the proportion of $Mg(OH)_2$ can be quantified by thermogravimetry by considering the weight loss between 200 and 450° C., in particular between 220 and 420° C., more particularly between 250 and 400° C., which corresponds to water release due to dehydroxylation of $Mg(OH)_2$; ($Mg(OH)_2$, decomposes into $MgO+H_2O$).

In the case of calco-magnesian products containing $Ca(OH)_2$, the proportion of $Ca(OH)_2$ can be quantified by thermogravimetry by considering the weight loss between 400 and 600° C., in particular between 420 and 580° C. and more particularly between 450 and 560° C., which corresponds to water release due to the dehydroxylation of $Ca(OH)_2$; [$Ca(OH)_2$ decomposes into $CaO+H_2O$].

In the case of calco-magnesian products containing $CaCO_3$, the proportion of CaCOs can be quantified by thermogravimetry by considering the weight loss between 600 and 900° C., in particular between 620 and 850° C. and more particularly between 650 and 800° C., which corresponds to release of $CO_2$ due to decarbonatation of CaCOs; (CaCOs decomposes into $CaO+CO_2$).

In the meaning of the present invention, by a <<MgO conversion rate>> (denoted $tc_{MgO}$ (%)), is meant the ratio between the number of moles of magnesium in the $Mg(OH)_2$ fraction of the final hydrated product and the number of moles of magnesium in the MgO initially contained in the calco-magnesian product before hydration. It can be calculated using formula 1 below:

$$tc_{MgO}(\%) = \frac{\% \, Mg(OH)_{2\,final} \times M_{MgO}}{M_{Mg(OH)2} \times \% \, MgO_{initial} \times \left(1 - \frac{e_1 + e_2}{100}\right)} \times 100\% \quad \text{Formula 1}$$

% $Mg(OH)_{2FINAL}$ represents the weight proportion of $Mg(OH)_2$ in the hydrated product such as determined after weight loss corresponding to decomposition of $Mg(OH)_2$ on the thermogravimetric curve;

% $MgO_{initial}$ is the weight proportion of MgO in the product to be hydrated, determined by X fluorescence;

$M_{MgO}$ is the molar mass of MgO (g/mol) (40.3 g/mol);

$M_{Mg(OH)2}$ is the molar mass of $Mg(OH)_2$ (g/mol) (58.3 g/mol);

e1 is the water attached to $Mg(OH)_2$ in the hydrated product and therefore corresponds to the absolute value of the first weight loss on the thermogravimetric curve;

e2 is the water attached to $Ca(OH)_2$ in the hydrated product and therefore corresponds to the absolute value of the second weight loss on the thermogravimetric curve.

Advantageously, according to the present invention, the conversion rate of MgO to $Mg(OH)_2$ is improved by 30%, preferably by 100%, preferably by 150% and further preferably by 200% compared with the conversion rate obtained in the absence of additive. This conversion rate is also preferably obtained with reaction times of less than 5 hours, preferably less than 2 hours and more preferably less than 1 hour, in particular in less than 30 minutes and still further particularly in less than 20 minutes, the shortest times being applied for continuous processes; in some cases, a reaction time of 15 minutes, even 10 minutes or less will be sufficient.

The improved conversion rate of MgO to $Mg(OH)_2$ can be calculated using formula 2 below:

$$\text{increase } tc_{MgO}(\%) = \frac{t2 - t1}{t1} \times 100\% \quad \text{Formula 2}$$

t1 represents the degree of conversion of MgO to $Mg(OH)_2$ obtained in the absence of additive;

t2 represents the degree of conversion of MgO to $Mg(OH)_2$ obtained after additive addition.

The effective reaction time may be longer than the residence time in the hydrator. By <<reaction time>> a in the meaning of the present invention is meant the time elapsed since the contacting of the said calco-magnesian product with the said aqueous phase until the aforementioned degree of conversion is obtained. This time includes the residence time of the product in the reactor used to perform hydration and may also include an additional time during which the aqueous phase remains in contact with the calco-magnesian product after the hydration phase. For as long as the aqueous phase is not separated from the calco-magnesian product (filtration, screening . . . ), the latter may continue to be hydrated. It is observed that with the additives of the invention, the additional slaking occurring after the residence time in the hydrator is also accelerated compared with a situation without additive.

The preferred hydration equipment for implementing the method of the invention is conventional wet process hydration equipment. This equipment is a wet process detention slaker for example, a wet process paste slaker, a ball mill slaker, a vessel under continuous or discontinuous agitation, a screw slaker or drum slaker. In one preferred embodiment of the invention, the said calco-magnesian compound is a powder compound. The hydrator is then fed with a powdery compound containing MgO of particle size between 20 μm and 10 mm, preferably <5 mm, preferably <2 mm.

In the meaning of the present invention, the term <<wet slaking>> means slaking that does not use a dry process, which leads to the formation of a powder product. In other words, <<wet process>> means slaking, which leads to the formation of a paste or suspension of solid particles. Preferably the said slaked solid particles of calcium and magnesium hydroxides form a suspension or paste of solid particles containing at least 30% water. The molar proportion of water/MgO-containing solid particle is higher than 1.2, in particular higher than 1.5, provided that the slaking method uses a wet process. Advantageously, the method according to the present invention also comprises sieving of the suspension obtained and/or a de-agglomeration or a miling step of the said slaked solid $Mg(OH)_2$ particles.

Typically, in one preferred embodiment of the method of the invention, the said aqueous slaking phase has a temperature before slaking of between 35 and 90° C.

Other embodiments of the method of the invention are indicated in the appended claims.

Other characteristics, details and advantages of the invention will become apparent from the following description given below that is non-limiting and refers to the appended Examples and Figures.

DETAILED DESCRIPTION OF THE INVENTION

The method of the invention therefore uses hydration via wet process that is controllable, rapid and simple of inter alia calcined dolomite, dolomitic or magnesium lime or of any compound containing MgO, with a high conversion rate and up until obtaining of fully hydrated products using standard hydration equipment through the use of an additive in preferred proportions of 0.1 to 20%, preferably 1 to 10% by weight relative to the total weight of MgO.

The additives of the present invention are selected from the group formed by water-soluble metal hydroxides particularly alkaline hydroxides (in particular Na, Li or K hydroxides), water-soluble metal silicates particularly water-soluble alkaline or alkaline-earth silicates (in particular Na, Li, K, Ca or Mg silicates), water-soluble aluminates particularly K, Na, Li or $NH_4$ aluminates (in particular sodium aluminate), water-soluble aluminium salts, particularly aluminium fluoride, nitrate, chloride or lactate (in particular aluminium nitrate and lactate), water-soluble metal halides, particularly chlorides, bromides or fluorides, water-soluble metal nitrates, water-soluble metal lactates, water-soluble ammonium salts, ammonia and the mixtures thereof.

Example 1

Figure 1:
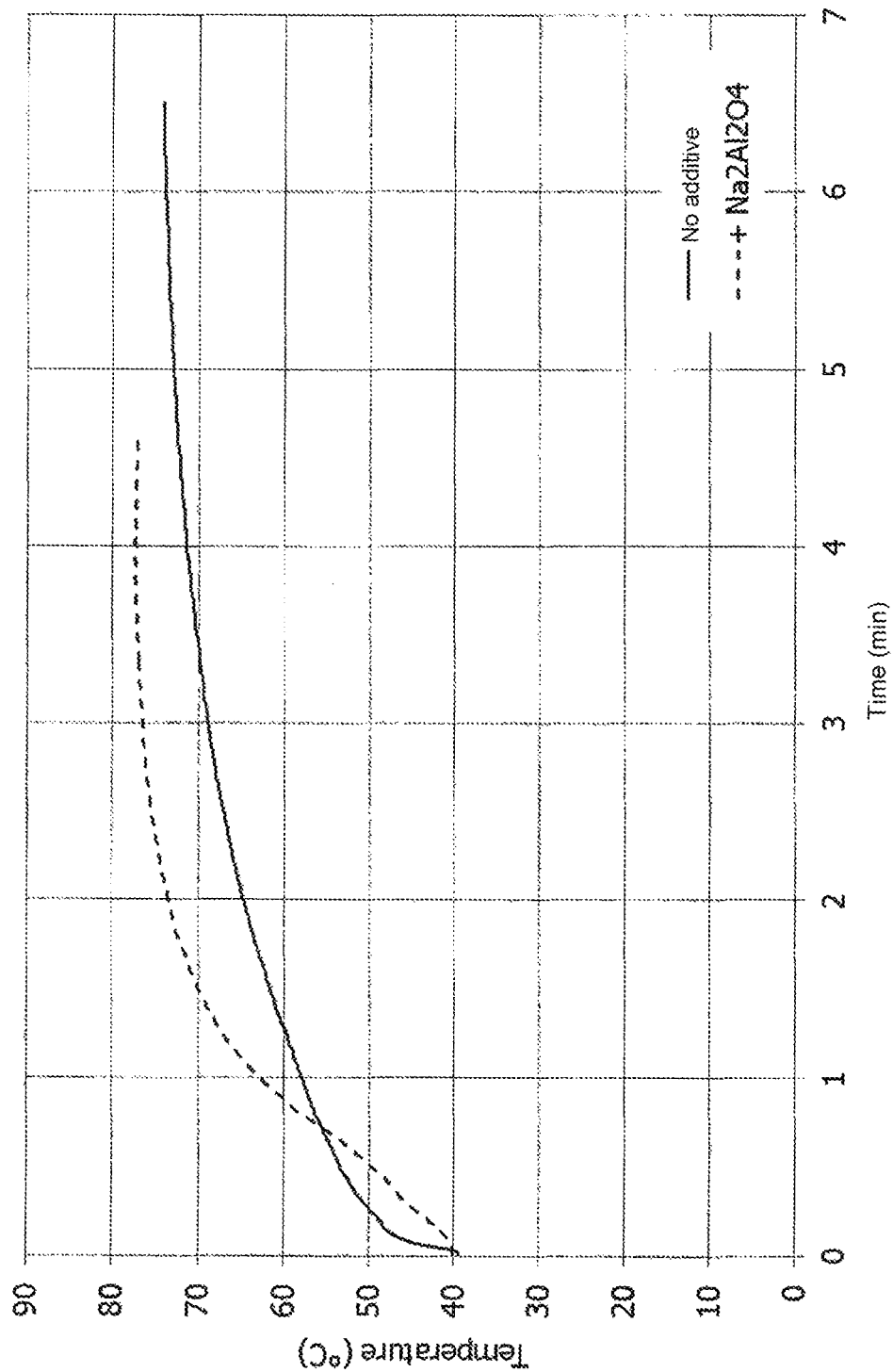
FIG. 1 illustrates the influence of an additive according to the invention, compared with a comparative Example without additive, on the slaking reaction of calcined dolomite 1.

The slaking reaction was performed following the typical configuration of the reactivity test as per standard ASTM C110-02: 2002 §12. Therefore, initially 120 g of dolomitic quicklime 1 were added to 400 g of slaking water at 40° C. not containing any additive (reference). Next another sample of 120 g of this dolomitic quicklime 1 was added to a solution of sodium aluminate (formula $Na_2Al_2O_4$) at 40° C. previously prepared by dissolving 4 g of sodium aluminate in 396 g of demineralised water. In both cases the reaction mixture was stirred at 250 rpm. The sample of dolomitic lime 1 was a fine fraction having a particle size doe of 3 mm or less and industrially produced. It contained 39.7% MgO and 55.1% CaO (weight proportions determined by X-ray fluorescence) which corresponds to a Ca/Mg molar ratio (or x/y) of 1.00 and the reactivity thereof is described in Table 1 and in FIG. 1.

These slaking reactions were conducted in a vessel of DEWAR type having a capacity of 665 $cm^3$ equipped with a shaft with four paddles and with a temperature probe for the automatic acquisition of temperature data over time (one measurement every second). From the curve given in FIG. 1, the following characteristics were determined:
 a) $t_{60}$ representing the time needed for the reaction medium to each 60° C. from the initial temperature set at 40° C.;
 b) $t_{70}$ representing the time needed for the reaction medium to reach 70° C. from the initial temperature set at 40° C.;
 c) TTM representing the time to maximum temperature of the reaction medium i.e. when no temperature rise of more than 0.5° C. is observed over three consecutive measurements.

The suspension (or milk) of dolomite obtained was held under agitation until the TTM value was reached then is screened through a 250 µm mesh, the retained fraction being dried at 110° C. and weighed. The weight percentage of these retained particles was then calculated in relation to the starting quantity of dolomitic quicklime in the form of fine particles. These retained particles are called <<Rejects>> and indicate the size of the fraction of the coarse, undesired particles obtained during slaking. This data is given in Table 1 below.

The product which passed through the sieve was rapidly dried at 150° C. and analysed. The contents of $Mg(OH)_2$ and $Ca(OH)_2$ were calculated on the basis of measurement of heat loss under TGA as described above. The conversion rate of MgO was then calculated using formula 1. All the results are given in Table 1 and illustrated in FIG. 1.

TABLE 1

| Example | $t_{60}$ [min] | $t_{70}$ [min] | TTM [min] | Rejects wt. % | $d_{50}$ weight % | $Mg(OH)_2$ final weight % | MgO initial weight % | e1 weight % | e2 weight % | $tc_{MgO}$[(1)] % | increase $tc_{MgO}$ % |
|---|---|---|---|---|---|---|---|---|---|---|---|
| Dolomite 1 without additives | 1.27 | 3.15 | 5.47 | 5.25 | 11.25 | 17.2 | 39.7 | 5.3 | 12.5 | 36.4 | |
| Dolomite 1 + $Na_2Al_2O_4$ (Example 1) | 0.87 | 1.52 | 3.60 | 1.17 | 6.16 | 39.3 | 39.7 | 12.1 | 12.5 | 90.8 | 149 |

[(1)]Conversion rate of MgO to $Mg(OH)_2$ calculated using formula 1.

The reactivity results (FIG. 1) show that not only was the reaction highly accelerated (even if a less rapid increase was initially observed in comparison with the comparative example without additive used as reference) in the presence of sodium aluminate in relation to an additive-free reference, but also the final temperature obtained was higher indicating a higher conversion rate.

All the results are reproduced in Table 1.

For the example according to the present invention, in the presence of sodium aluminate, practically complete conversion was observed (about 90% conversion rate) despite a very short reaction time in the order of only 5 minutes. In addition, the suspension obtained in the form of dolomite milk was much finer in the presence of sodium aluminate. The suspension had a median diameter $d_{50}$ of about 6 µm and only 1% was rejected by 250 µm screening compared with the case using a product without additive (ds of about 11 to 13 µm and 5 weight % rejected after 250 µm screening).

Example 2

Example 2 was similar to Example 1 in that a dolomite was hydrated under the same conditions and in the presence of sodium aluminate (3% relative to the weight of dolomitic quicklime). The differences between this Example 2 and Example 1 were:
 this time a dolomitic quicklime 2 was hydrated containing 39.5% MgO and 51.9% CaO (i.e. x/y mol=0.94) having the reactivity described in Table 2 and FIG. 2;
 the reaction time was 1 hour, the suspension of dolomite remaining under stirring 1 hour in the Dewar vessel before being filtered, dried and analysed as in Example 1;
 this time the dolomite suspension was not sieved and the conversion rate therefore represented the entirety of the solid contrary to Example 1, in which some coarse particles were removed by screening.

Figure 2:
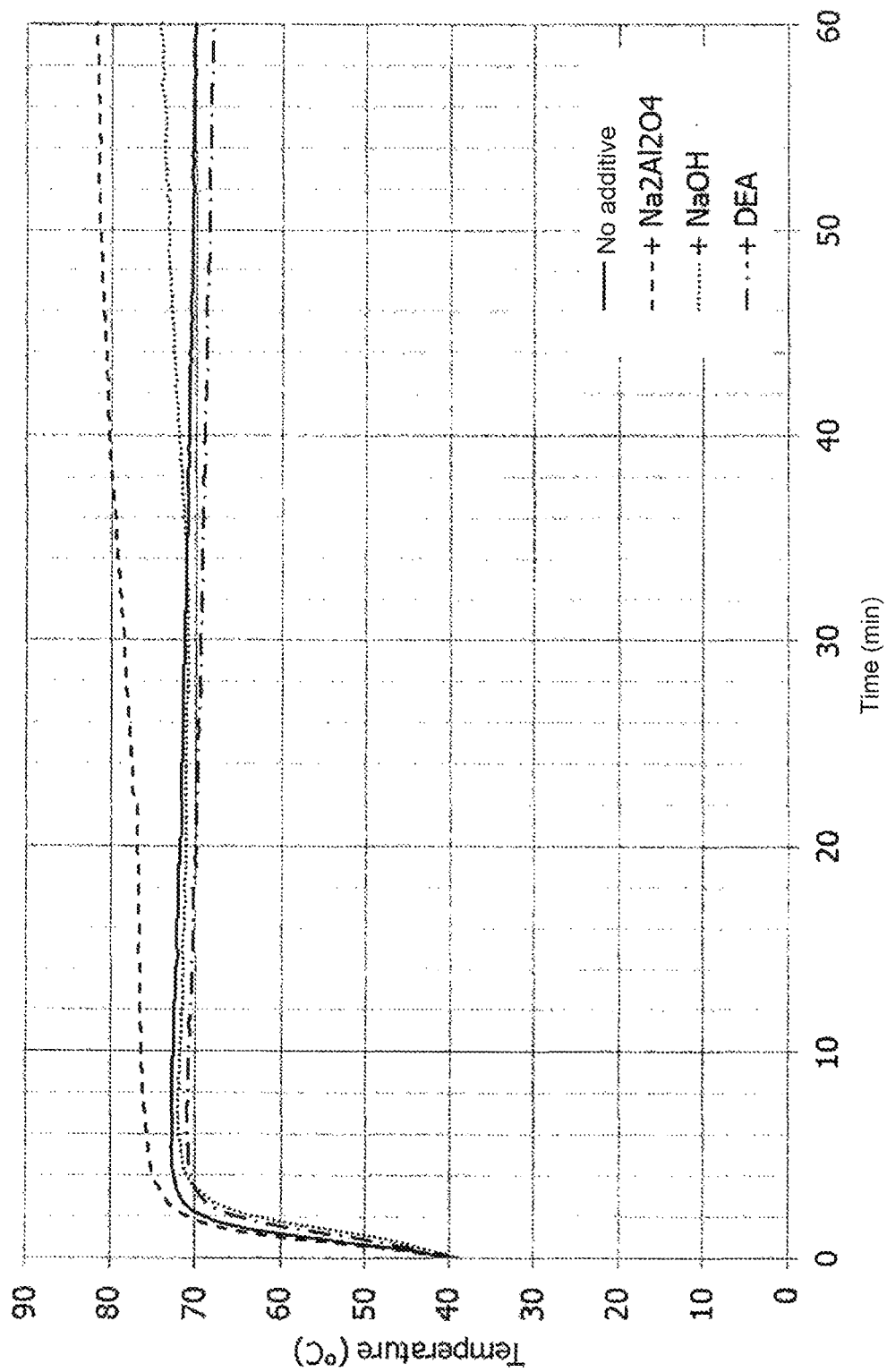
FIG. 2 shows the influence of different additives ($Na_2Al_2O_4$ and NaOH) according to the invention in relation to comparative examples without additive or in the presence of DEA on the slaking reaction of calcined dolomite 2.

As shown in FIG. 2, the addition of sodium aluminate during the hydration reaction allows an increase in hydration temperature and led to higher conversion rates (Table 2).

Example 3

This example is exactly similar to Example 2, only the sodium aluminate was replaced by sodium hydroxide (NaOH) all proportions remaining equal.

FIG. 2 shows that this additive led to a second increase in temperature after 30 minutes finally leading to a higher final temperature and hence to an improved hydration rate (Table 2). A reaction time of more than 1 hour under the same conditions (1 h30) for example) should lead to an even further improved hydration rate.

Comparative Example

This comparative example is exactly similar to Examples 2 and 3, but this time the additive was diethanol-amine (DEA) also added in the proportion of 3% relative to the weight of the initial dolomitic quicklime. This time the additive led to a slight delay in the hydration reaction and to a slight reduction in hydration temperature (FIG. 2). As a result the hydration rate of the MgO portion of dolomite 2 was decreased (Table 2).

The present invention is evidently in no way limited to the above-described embodiments and numerous modifications can be made thereto without departing from the scope of the appended claims.

TABLE 2

| Example | $t_{60}$ [min] | $t_{70}$ [min] | TTM [min] | $Mg(OH)_2$ final weight % | MgO initial weight % | e1 weight % | e2 weight % | tcMgO[1] % | increase $tc_{MgO}$ % | SSA [2] |
|---|---|---|---|---|---|---|---|---|---|---|
| Dolomite 2 without additives | 1.12 | 2.18 | 4.98 | 20.1 | 39.5 | 6.2 | 13.6 | 43.9 | | 10.0 |
| Dolomite 2 + $Na_2Al_2O_4$ (Example 2) | 0.95 | 1.77 | 60 | 29.5 | | 9.1 | 13.3 | 66.4 | 51 | 15.5 |
| Dolomite 2 + NaOH (Example 3) | 1.70 | 3.38 | 60 | 26.2 | | 8.1 | 13.2 | 58.3 | 33 | 10.3 |
| Dolomite 2 + DEA (comparative Example 1) | 1.47 | 3.28 | 5.97 | 16.8 | | 5.2 | 13.2 | 36.0 | −18 | 10.4 |

[1]Conversion rate of MgO to $Mg(OH)_2$ calculated using formula 1.
[2]BET specific surface area measured on the basis of nitrogen adsorption manometry analysis after a degassing time of at least 2 hours at 190° C.

The invention claimed is:

1. A method for the wet slaking of calcium and magnesium oxides of a calco-magnesian compound, comprising the steps of:
   feeding a calco-magnesian compound containing MgO into a slaking equipment;
   feeding an aqueous slaking phase into the said slaking equipment; and
   slaking the said calcium and magnesium oxides of the said calco-magnesian compound fed into the said slaking equipment, with the said aqueous slaking phase, leading to the formation of slaked solid particles of calcium and magnesium hydroxides,
wherein the said slaking is performed at ambient pressure in the presence of an additive selected from the group consisting of water-soluble metal hydroxides, water-soluble metal silicates, water-soluble aluminates, water-soluble aluminium salts, water-soluble metal halides, water-soluble metal nitrates, water-soluble metal lactates, water-soluble ammonium salts, ammonia and the mixtures thereof, the said calcium and magnesium oxides of the calco-magnesian compound having a magnesium oxide content of at least 10% by weight and less than 50% by weight relative to the weight of the said calco-magnesian compound, and having a calcium/magnesium molar ratio of between 0.8 and 1.2.

2. The slaking method according to claim 1, wherein the said calco-magnesian compound is selected from the group consisting of calcined or semi-hydrated dolomite, mixed calco-magnesian compounds and the mixtures thereof.

3. The slaking method according to claim 1, wherein the said water-soluble metal hydroxides are selected from the group consisting of alkaline hydroxides and the mixtures thereof.

4. The slaking method according to claim 1, wherein the said water-soluble metal silicates are selected from the group consisting of alkaline silicates, alkaline-earth silicates and the mixtures thereof.

5. The slaking method according to claim 1, wherein the said water-soluble aluminates are selected from the group consisting of potassium aluminate, sodium aluminate, lithium aluminate, ammonium aluminate and the mixtures thereof.

6. The slaking method according to claim 1, wherein the said water-soluble metal halides are selected from the group consisting of metal chlorides, metal bromides, metal fluorides and the mixtures thereof.

7. The slaking method according to claim 1, wherein the said water-soluble aluminium salts are selected from the group consisting of aluminium fluoride, aluminium nitrate, aluminium chloride, aluminium lactate and the mixtures thereof.

8. The slaking method according to claim 1, wherein the said water-soluble metal nitrates are selected from the group consisting of alkaline nitrates, alkaline-earth nitrates and the mixtures thereof.

9. The slaking method according to claim 1, wherein the said water-soluble metal halides are selected from the group consisting of alkaline halides, alkaline-earth halides and the mixtures thereof.

10. The slaking method according to claim 1, wherein the said metal halides, the said metal nitrates and the said metal lactates comprise at least one atom of a metal selected from the group consisting of aluminium, calcium and magnesium.

11. The slaking method according to claim 1, wherein the said metal halides, the said metal nitrates and the said metal lactates comprise at least one atom of a metal selected from the group consisting of aluminium and magnesium.

12. The slaking method according to claim 1, wherein the said additive is added to the said aqueous slaking phase prior to the said feeding of the said aqueous slaking phase to form an additive-containing aqueous slaking phase.

13. The slaking method according to claim 1, wherein the said additive is added to the said aqueous slaking phase inside the said slaking equipment or in the said feed of the said aqueous slaking phase.

14. The slaking method according to claim 1, wherein the said additive is added to the said MgO-containing compound or in the said feed of the said calco-magnesian compound.

15. The slaking method according to claim 1, wherein the said additive is supplied at a content of between 0.1 and 20% by weight relative to the total weight of MgO.

16. The slaking method according to claim 1, wherein the said calco-magnesian compound has a degree of conversion of MgO to $Mg(OH)_2$ of at least 10% as measured by a simplified determination test of the degree of conversion.

17. The slaking method according to claim 1, wherein the said slaking equipment is a wet process hydrator.

18. The slaking method according to claim 1, wherein the MgO degree of conversion to $Mg(OH)_2$ is improved by 30% relative to the degree of conversion obtained without an additive.

19. The slaking method according to claim 17 wherein the said slaking step has a reaction time less than 5 hours.

20. The slaking method according to claim 1, wherein the said calco-magnesian compound is a powder compound.

21. The slaking method according to claim 1, wherein the said slaked solid particles of calcium and magnesium hydroxides form a suspension or a paste of solid particles containing at least 30% water.

22. The slaking method according to claim 1, further comprising a step to de-agglomerate or mill the said slaked solid particles of calcium and magnesium hydroxides.

23. The slaking method according to claim 21 further comprising a step to sieve the said suspension.

24. The slaking method according to claim 1, wherein the said aqueous slaking phase has a temperature before slaking of between 35 and 90° C.

\* \* \* \* \*